Oct. 25, 1938.  J. M. FLOYD  2,134,508
UNIVERSAL JOINT
Filed Feb. 21, 1936  9 Sheets-Sheet 1
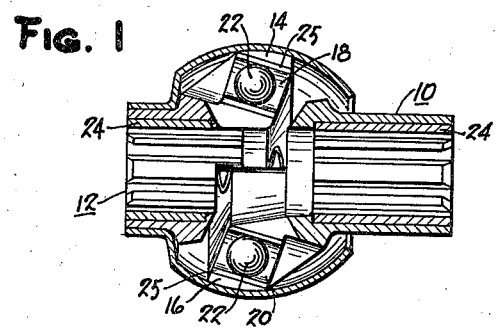
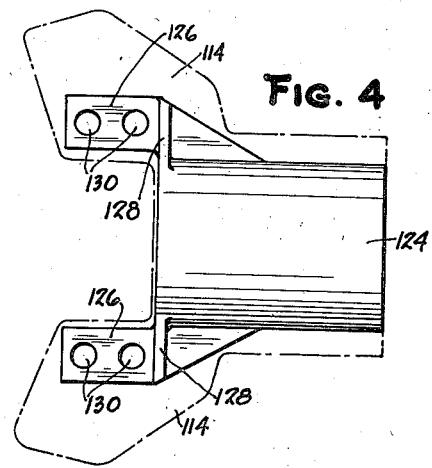
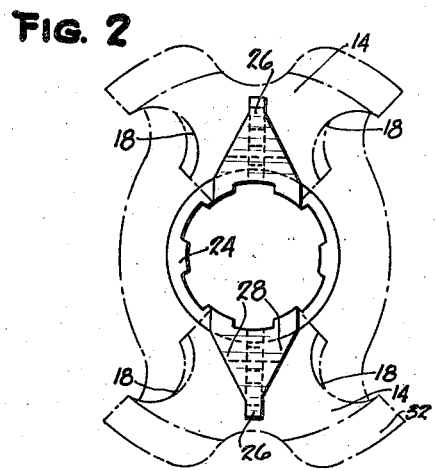
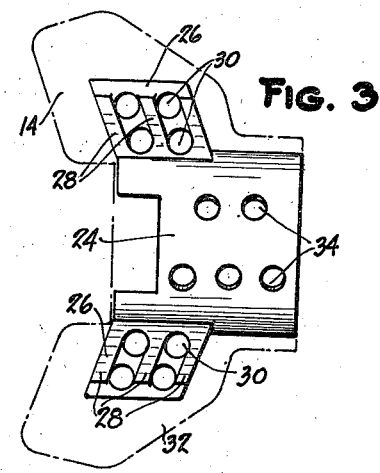
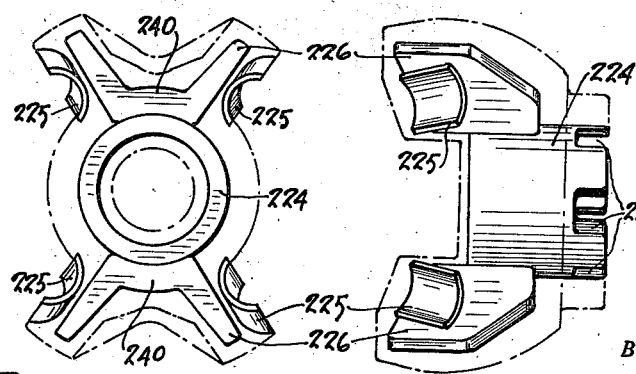
INVENTOR.
JOHN M. FLOYD
BY A. E. Wilson.
ATTORNEY.

Oct. 25, 1938.  J. M. FLOYD  2,134,508
UNIVERSAL JOINT
Filed Feb. 21, 1936  9 Sheets-Sheet 2

INVENTOR.
JOHN M. FLOYD
BY *A. E. Wilson.*
ATTORNEY.

Oct. 25, 1938.   J. M. FLOYD   2,134,508
UNIVERSAL JOINT
Filed Feb. 21, 1936    9 Sheets-Sheet 3

INVENTOR.
JOHN M. FLOYD
BY A. E. Wilson
ATTORNEY.

Oct. 25, 1938.    J. M. FLOYD    2,134,508
UNIVERSAL JOINT
Filed Feb. 21, 1936    9 Sheets-Sheet 4
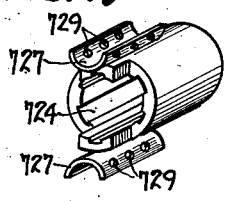
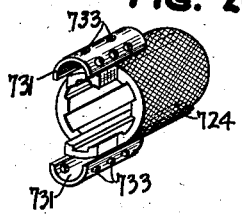
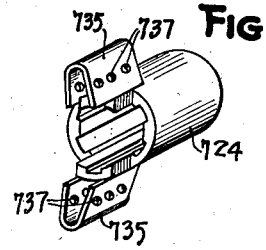
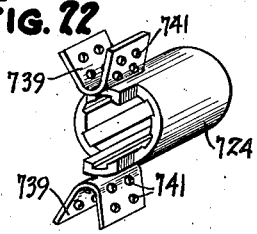
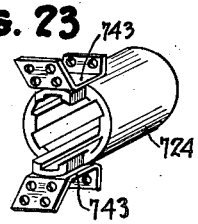
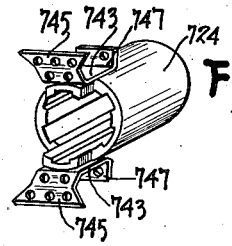
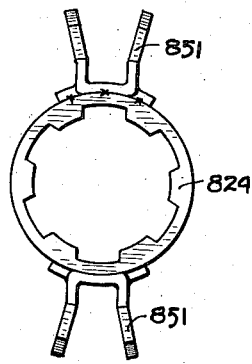
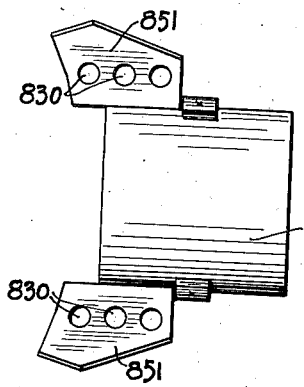
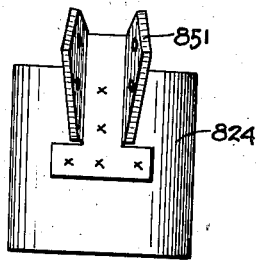
INVENTOR.
JOHN M. FLOYD
BY
ATTORNEY.

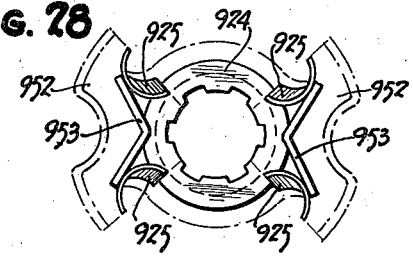
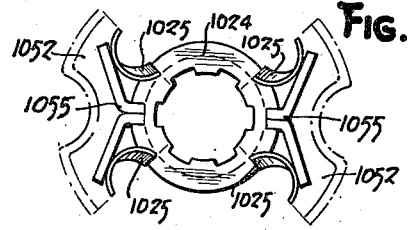
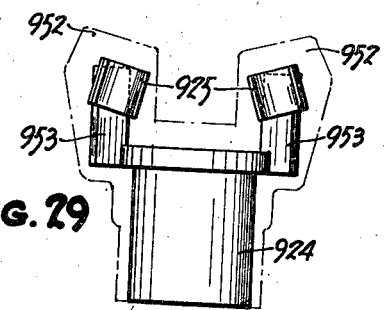
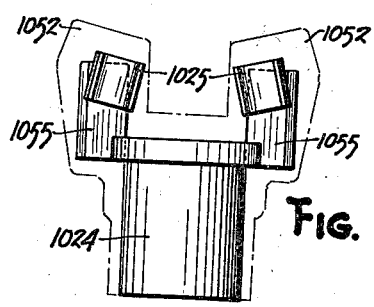
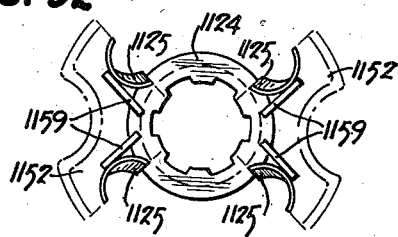
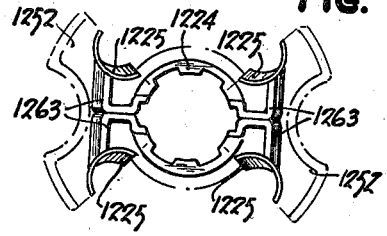
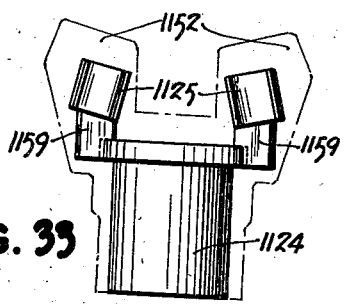
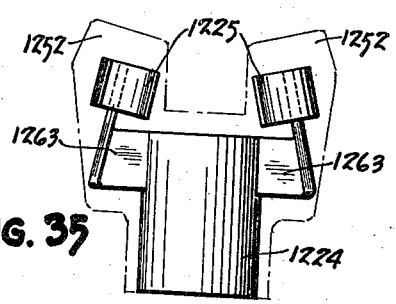

Oct. 25, 1938.                J. M. FLOYD                  2,134,508
                           UNIVERSAL JOINT
                         Filed Feb. 21, 1936        9 Sheets-Sheet 6

INVENTOR.
JOHN M. FLOYD
BY
A. C. Wilson
ATTORNEY.

Oct. 25, 1938.  J. M. FLOYD  2,134,508
UNIVERSAL JOINT
Filed Feb. 21, 1936  9 Sheets-Sheet 7
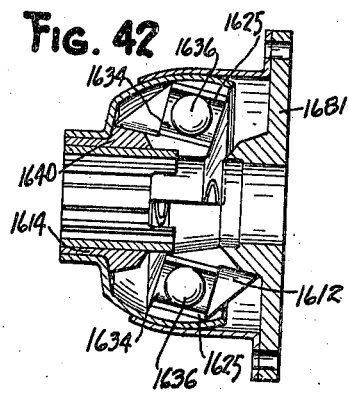
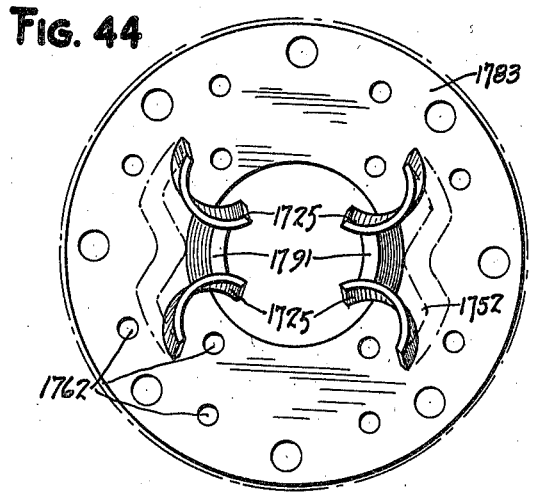
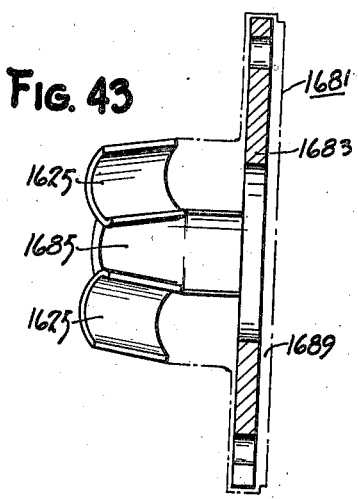
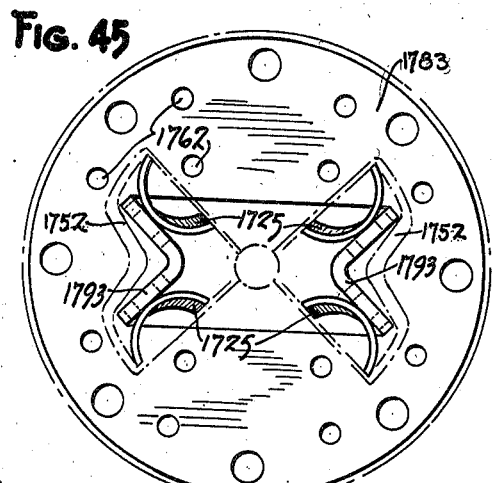
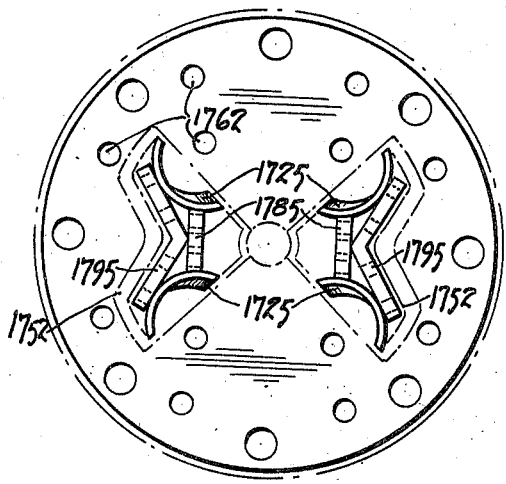
INVENTOR.
JOHN M. FLOYD
BY
ATTORNEY.

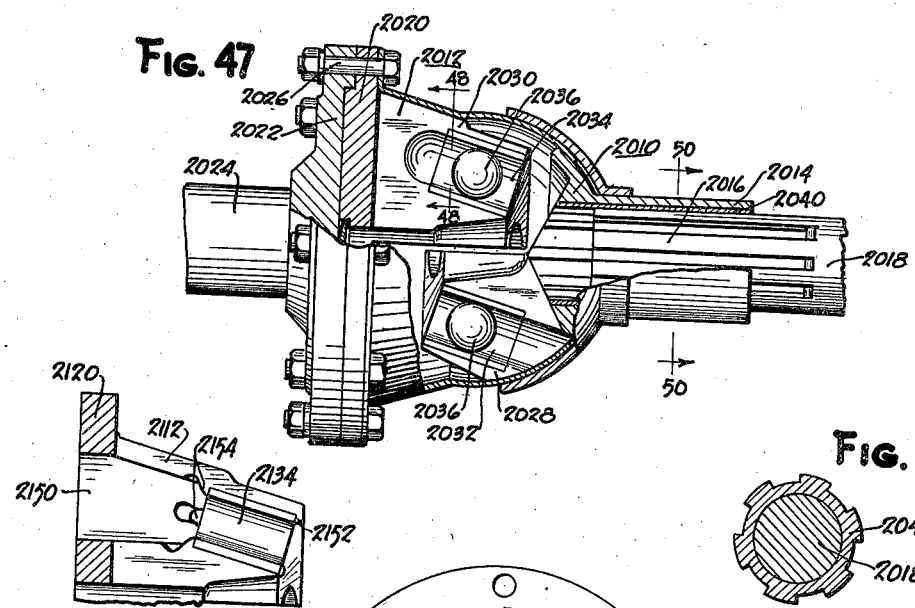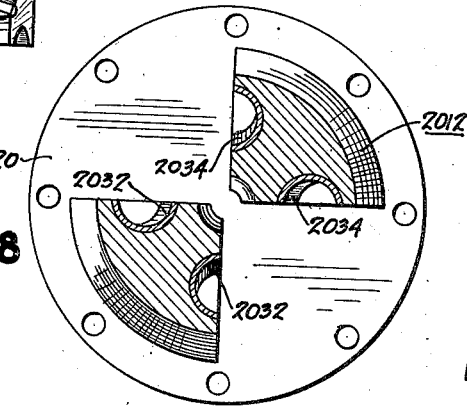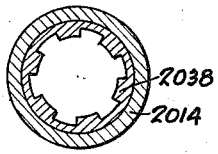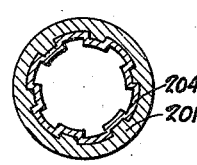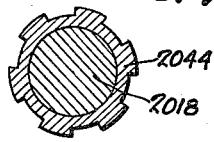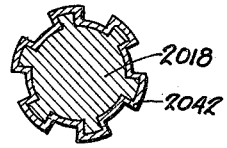

Oct. 25, 1938.   J. M. FLOYD   2,134,508
UNIVERSAL JOINT
Filed Feb. 21, 1936   9 Sheets-Sheet 9
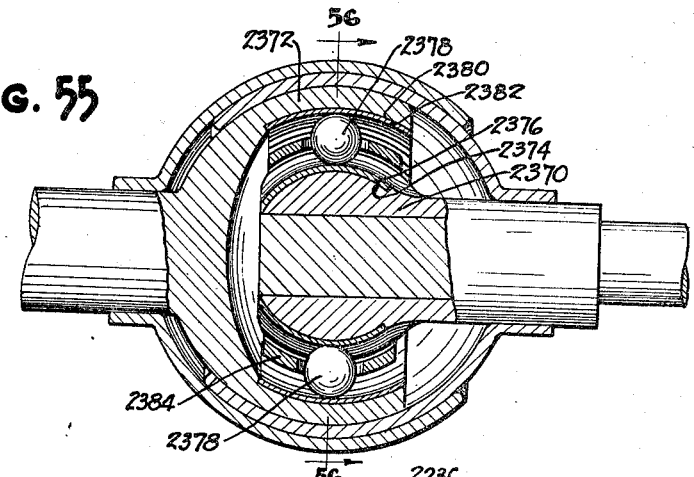
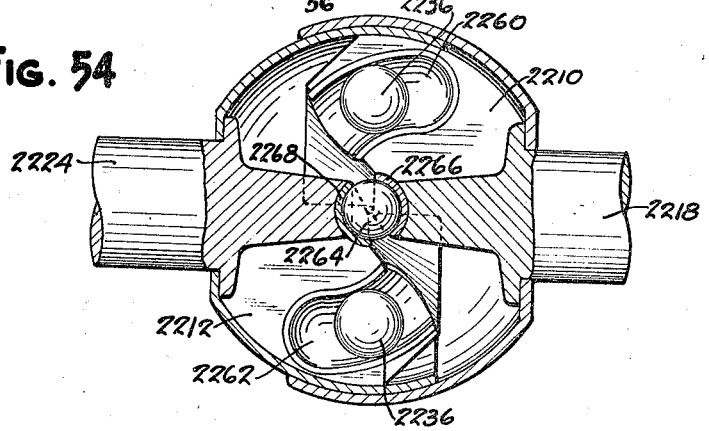
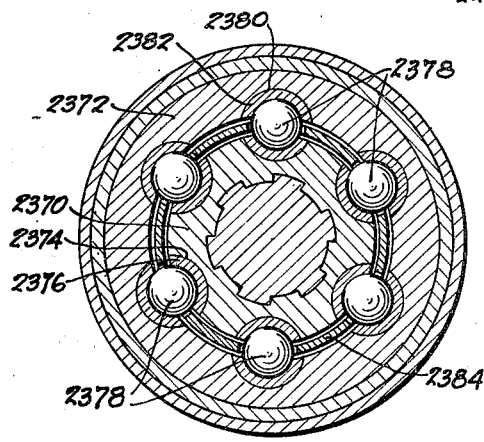
INVENTOR.
JOHN M. FLOYD
BY A. E. Wilson
ATTORNEY.

Patented Oct. 25, 1938

2,134,508

UNITED STATES PATENT OFFICE 2,134,508

UNIVERSAL JOINT

John M. Floyd, South Bend, Ind., assignor to Bendix Products Corporation, South Bend, Ind., a corporation of Indiana Application February 21, 1936, Serial No. 65,068

19 Claims. (Cl. 64—21)

This invention relates to universal joints and more particularly to universal joints of the constant angular velocity type adapted to be die-cast, and provided with hardened steel inserts to transmit and distribute torsional forces over a considerable portion of the body section of the joint.

Universal joints of the constant angular velocity type are generally provided with spherical members interposed between two cooperating joint yokes or body members of the joint. The spherical members are adapted to transmit torsional forces from one of the body members to the other body member, and to bisect the angle between the driving and driven shafts to which the body sections of the joint are fixed.

There are two principal types of constant angular velocity joints. (1) Those in which the spherical members are positioned in cooperating longitudinally extending grooves formed in the sides of cooperating arms carried by the body members of the joint, to transmit torsional forces from one of the body members to the other in compression; and (2) those in which the spherical members are positioned in cooperating longitudinally extending grooves formed in the inner and outer surfaces of two concentric spheres forming the body members of the joint, and transmit torsional forces from one of the body members to the other in shear.

In both of these types of joints, the spherical members are positioned in cooperating longitudinally extending grooves or raceways formed in each of the body members of the joint. Means are provided to cause the spherical members to bisect the angle between the driving and the driven shafts. The spherical members therefore move longitudinally with reference to the body members of the joint as the shafts move out of alinement.

In view of the fact that the entire torsional forces are transmitted from one member of the joint to the other through the spherical members, it is necessary that the longitudinally disposed grooves or raceways be formed of a hard material to withstand the stresses to which they are subjected. It has therefore been necessary to form the body members of these joints of a material of sufficient hardness to withstand the stresses to which the raceways are subjected. This has usually been done by forging or casting the entire body sections of the joint of cast iron or other suitable material, and subsequently machining the raceways to a suitably smooth finish. The manufacturing cost of the joint has therefore been relatively high, and the finished joint has been heavier than is desirable for certain types of installation.

The present invention is directed to a universal joint structure wherein the body sections of the joint may be die-cast of a relatively light alloy, hardened inserts of steel or other suitable material being employed to form the raceways and to distribute the torsional forces over a relatively large area of the die-cast body sections of the joint. The inserts may be ground and heat treated before the body section of the joint is cast. In view of the fact that the temperature employed in the die-casting operation is less than the temperature used in the heat treating operation of the inserts, it is unnecessary to do any machine work on the joint after it is removed from the die-casting machine.

The body sections of the joint may be formed with splines or flanges adapted to connect the body sections of the joint to the driving or driven shafts. Where splines, either of the internal or the external type are employed, an insert of hardened steel or other suitable material may if desired be employed, where the diameter of the shaft, the allowable length of spline, and the torsional force transmitted are such as to overstress the material of the die-cast body section.

It is therefore an object of this invention to provide a universal joint of the constant angle velocity type wherein the body sections of the joint may be die-cast of a suitable alloy and wherein hardened inserts of suitable material are provided to distribute the torsional forces to the body members of the joint.

Another object of the invention is to provide a universal joint having hardened inserts positioned at all points subjected to the forces exerted in transmitting forces between two shafts, and a die-cast body section formed of a suitable alloy.

A further object of this invention is therefore to provide a universal joint having a die-cast body section, and provided with a reinforced structure to adequately support the joint.

Another object of the invention is to provide a universal joint having fabricated inserts surrounded by a die-cast body section.

A further object of the invention is to provide a method of forming an insert for a universal joint by forming two complementary stampings and welding the stampings together.

A still further object of the invention is to provide a universal joint member having a die-cast body section, reinforced by a splined rigidifying and strengthening member.

Yet a further object of the invention is to form a die-cast universal joint reinforced by a splined insert positioned in the shank of the joint, the splined section being provided with a plurality of built-up projections extending from the shank of the joint into the arms thereof.

Another object of the invention is to form a die-cast universal joint having connected race and splined inserts reinforcing the die-cast body section.

A further object is to provide a reinforced die-cast universal joint of the constant angle velocity type wherein race inserts are provided to distribute the torsional forces to which the arms of the joint are subjected, uniformly over a considerable portion of the section of the arm, and the race inserts are connected to a splined insert positioned in the body section of the joint.

Another object of the invention is to provide a universal joint which may be manufactured economically, and which requires the minimum of machine work on the joint after it is formed.

A still further object of the invention is to provide a reinforced die-cast universal joint of light weight, yet possessing great strength per unit weight, to adequately withstand the stresses to which the joint is subjected when in use.

Another object of the invention is to provide a cast universal joint provided with reinforcing inserts, wherein the body section of the joint may be united with the inserts by a die-casting operation, a fixed mold casting operation, or a centrifugal casting operation.

A further object of the invention is to provide a die-cast universal joint having a reinforcing splined member, provided with segments extending into the arms of the joint, to strengthen that portion of the joint, and the working surface of the arms being provided with race inserts to distribute the loads over a considerable portion of the metal of the arm members.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 1 is a vertical section through a constant angular velocity universal joint embodying the present invention;

Figure 2 is an end view of one of the body members of the joint illustrated in Figure 1;

Figure 3 is a side elevation of Figure 2;

Figure 4 is a view similar to Figure 3 showing a modified form of a universal joint segment;

Figure 5 is an end elevation of a joint member provided with reinforcing inserts, and a reinforcing web extending across the body section of the joint;

Figure 6 is a side elevation of the joint illustrated in Figure 5;

Figure 19 is an isometric projection of a splined insert provided with concaved arms adapted to project into the arms of the universal body section;

Figure 20 is a view similar to Figure 19 having convex reinforcing arm members;

Figure 21 is a view similar to Figures 19 and 20 having U-shaped arm reinforcing members wherein the apex of the section is remote from the splined insert member;

Figure 22 is a view similar to Figure 21 wherein the apex of the U-shaped member engages the splined reinforcing member;

Figure 23 is also an isometric projection of a splined insert having built-up arm reinforcing members;

Figure 24 is a view similar to Figure 23 showing a modified form of arm reinforcing members;

Figure 25 is an end view of a reinforcing splined insert;

Figure 26 is a side elevation of the insert of Figure 25;

Figure 27 is also a side elevation of Figure 25 taken at right angles to the view of Figure 18;

Figure 28 is an end view of a universal joint having interconnected reinforcing spline, arm and race inserts;

Figure 29 is a side elevation of Figure 28;

Figure 30 is a view similar to Figure 28 showing a modified structure;

Figure 31 is a side elevation of Figure 30;

Figure 32 is an end elevation of the universal joint showing a modified reinforcing structure;

Figure 33 is a side elevation of Figure 32;

Figure 34 is a view similar to Figure 32 showing a still further modified form;

Figure 35 is a side elevation of Figure 34;

Figure 42 is a vertical section of a universal joint wherein one of the body members is provided with a reinforcing flange;

Figure 43 is an enlarged view of the flanged member illustrated in Figure 42;

Figure 44 is an end elevation of Figure 43;

Figure 45 is a view similar to Figure 44 showing a modified form;

Figure 46 is a view similar to Figure 45 showing a still further modified form;

Figure 47 is an elevational view, partly in section of a universal joint embodying the present invention;

Figure 48 is a view taken on the line 48—48 of Figure 47;

Figure 49 is a fragmentary sectional view similar to a portion of Figure 47, showing a modified form of the invention;

Figure 50 is a view taken on the line 50—50 of Figure 47 showing an internally splined insert;

Figure 51 is a view similar to Figure 50, showing a modified form;

Figure 52 is a view similar in some respects to Figure 50, but showing an externally splined reinforcing member;

Figure 53 is a view similar to Figure 52, showing a modified form;

Figure 54 is a view similar in some respects to Figure 1, showing a curved race joint;

Figure 55 is a longitudinal sectional view through a universal joint wherein torsional forces are transmitted from one body member of the joint to the other in shear; and Figure 56 is a view taken on the line 56—56 of Figure 55.

Figure 7:
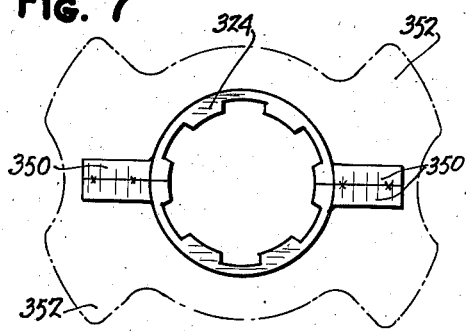
Figure 7 is an elevation of a joint having a splined insert provided with reinforcing segments extending into the arms of the joint.

Referring more particularly to Figure 1 there is shown a universal joint member of the constant angular velocity type, having opposed body members 10 and 12. Each of the body members is provided with a pair of arms 14 and 16, having semi-circular raceways 18 and 20 respectively, adapted to receive balls 22 between cooperating raceways of opposed arm members to transmit torsional force from one of the body members to the other. The body members 10 and 12 are preferably formed with splined inserts 24 formed of a material having great strength. The splined inserts 24 are preferably provided with radially extending reinforcing segments 26 projecting into the arms 14 and 16 respectively of the body sections. The body section of the joint is formed by a casting operation wherein an alloy is flowed over the inserts 24 to form a complete body member of the joint. The raceways 18 and 20 are preferably provided with reinforcing hardened inserts 25 designed to distribute the torsional load transmitted through the balls 22 from the arms of one joint member to the arms of the other joint member.

The splined inserts may be stamped, forged, cast or fabricated from any suitable metal such as iron or steel of various grades, brass or brass alloys, bronze or bronze alloys, et cetera. The splined inserts may be formed from stampings, fixed together in any desired manner such as by welding. The splined inserts may be broached to provide distinct splined sections, and may, if desired, be heat treated to increase the strength and durability of the splined section. While a large range of materials are satisfactory for forming the inserts it has been found that the metal of the general type S. A. E. 1015 forms a very desirable insert when the inserts are formed by a stamping operation.

The race inserts may also be stamped, forged, cast or fabricated of any suitable metal. The range of metals found desirable for race inserts is equivalent to the range pointed out above in connection with the splined inserts. It has been found that very good results are obtained by forming the race inserts of the metal of the general type of S. A. E. 1010. These race inserts may be stamped from the desired stock, or may be circular in form and split down the middle to form the semi-circular segments.

The race inserts should have a very hard surface, and are therefore preferably subjected to a heat treating process, wherein the race inserts are carbonized and quenched, to harden. These inserts may, if desired, be subjected to a normalizing treatment.

It has been found that one method of heat treating which gives very satisfactory results is to carbonize the inserts at approximately 1650 to 1700° F. This carbonizing process extended over a period of approximately eight hours will form a case hardened section of about .04 to .05 inch in depth. The inserts are preferably quenched in oil at approximately 1525° F. The inserts may, if desired, be drawn or normalized at approximately 380° F. This treatment will result in a hardness of approximately 60 points Rockwell over the surface of the raceways. It will be apparent of course that other methods of hardening the inserts may be employed if desired, such for example, as gas hardening. After the inserts have been thus treated they may, if desired, be ground to produce the desired smooth surface.

Any desired metal having satisfactory die-casting characteristics may be employed to form the body section of the joint. Such metals as the zinc base alloys, the aluminum base alloys, the brass or bronze alloys, brastil, and aluminum bronze are of course suitable materials from which to form the die-cast body section. The various metals may be alloyed in any desired proportion to give the proper strength and durability required and desirable for this type of work. After the body section is cast it may, if desired, be subjected to an aging process to increase the strength and durability of the joint. It has been found that the desired results can be procured by subjecting the body section to a steam bath at approximately 212° F. for approximately ten days. It has been found that materials of the general type known in the trade as die-cast metal number 3, referred to hereinafter give very satisfactory results.

Referring now more particularly to Figures 2 and 3 there is shown a body section of a universal joint having reinforcing segments 26 carried by the splined inserts 24. Reinforcing webs 28 extend between the splined insert and the reinforcing segments. A plurality of apertures 30 extend through the reinforcing segments 26 to facilitate a more secure bond between the die-cast body section 32 and the splined inserts 24. It will also be observed that a plurality of apertures 34 extend through the splined inserts 24 to facilitate the bonding action between the body section 32 and the splined insert 24.

The embodiments of the invention illustrated in Figures 4 to 46 are similar in many respects to the embodiment shown in Figures 1 to 3. Corresponding parts have therefore been designated by similar reference characters with the addition of 100 in each of different embodiments.

The embodiment of Figure 4 shows a structure wherein a modified form of reinforcing segments 126 project from the splined inserts 124 into the arms 116 of the joint member.

In the embodiments illustrated in Figures 5 and 6 it will be observed that the splined inserts 226 are provided at one end with a web section 240 extending across the end of the splined section to more securely tie the arms of the joint together at this section.

In this embodiment of the invention a plurality of serrations 227 are formed in one end of the body section of the joint to match with corresponding serrations carried in the end of a shaft or other matching member to transmit torsional force to or from the joint member. This expedient may be resorted to where the space occupied by the joint must of necessity be very small so that a splined connection of the type shown in Figures 1 to 4 cannot be employed to advantage.

Figure 8:
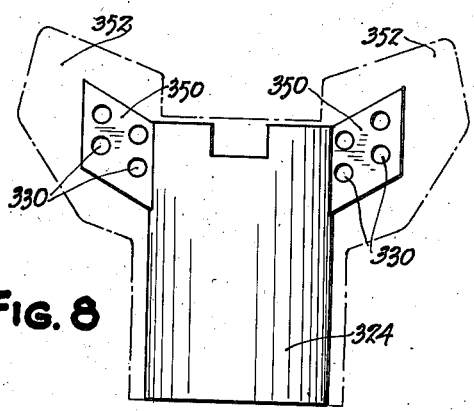
Figure 8 is a side elevation of the joint of Figure 7.

In the embodiment of Figures 7 and 8 the splined insert 324 is provided with radially extending segments 350 projecting into the arms 352 of the joint member.

Figure 9:
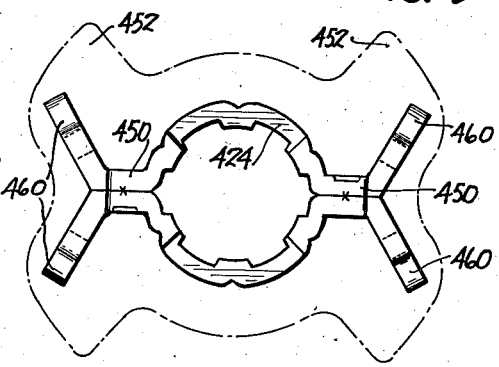
Figure 9 is a view similar to Figure 7 showing a modified form of spline and arm inserts.
Figure 10:
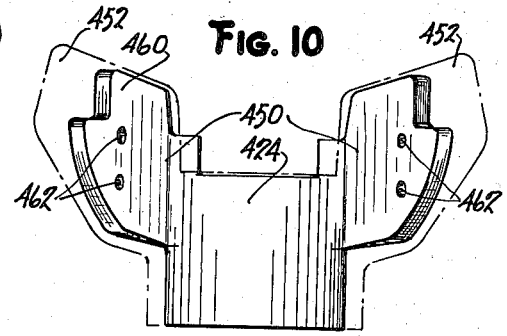
Figure 10 is a side elevation of the joint of Figure 9.
Figure 11:
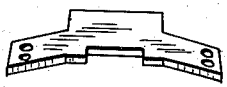
Figure 11 is a perspective view of a blank from which the inserts illustrated in Figures 7 to 10 may be formed by a stamping operation.
Figure 12:
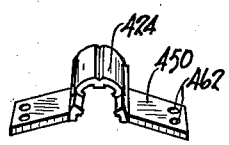
Figure 12 is a perspective view showing a stamped insert segment partially formed.
Figure 13:
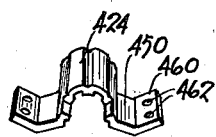
Figure 13 is a view similar to Figure 12 showing a further stage of the stamping operation.

Figures 9 and 10 show an embodiment similar in many respects to that shown in Figures 7 and 8. It will be observed, however, that the radially extending segments 450 are provided with flared outer portions 460 projecting further into the arms 452 to more securely reinforce the arm members against the radial forces to which the arms of the joint are subjected when in use. The flared outer portions 460 may be formed with apertures 462, through which the die-cast metal of the body section may flow to secure a more perfect bonding action between the die-cast body section and the reinforcing inserts of the joint.

Figure 14:
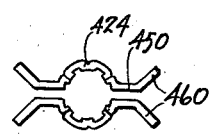
Figure 14 is an end elevation of a pair of stamped insert segments.

The inserts illustrated in Figures 7 to 10 may preferably be formed by a stamping process in a manner illustrated diagrammatically in Figures 11 to 14. It will be observed that a piece of stock is blanked out to the proper dimensions, and that the blank is progressively deformed by a series of stamping operations. Figure 14 illustrates a pair of oppositely disposed formed insert members ready to be fixed together by a welding operation to form the completed insert.

Figure 15:
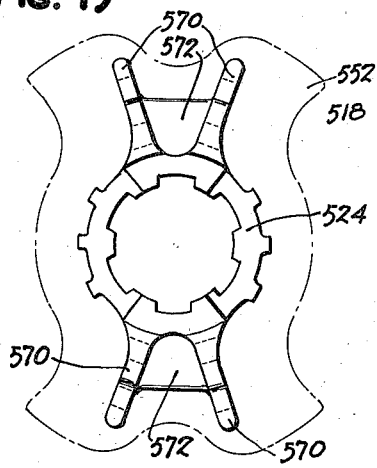
Figure 15 is an end elevation of a joint having a modified form of insert.
Figure 16:
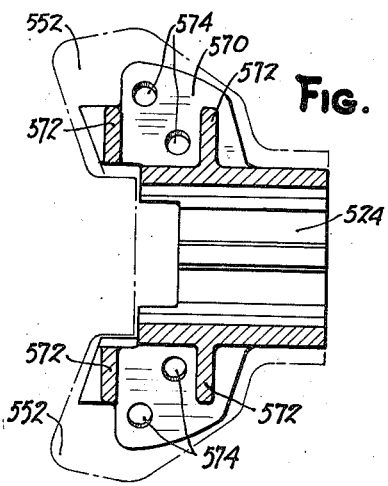
Figure 16 is a side elevation of the joint of Figure 15.

Figures 15 and 16 illustrate an embodiment of the invention wherein the reinforcing splined insert and radially extending segments may preferably be cast. It will be observed that the splined insert 524 is provided with a pair of radially extending rigidifying flanges 570 extending into each of the arms 552. Each of the bearing surfaces 518 is thus reinforced by one of the segments 570. The segments 570 are interconnected by means of webs 572 extending between each pair of segments 570. Each of the segments 570 is also formed with apertures 574 to facilitate the bonding action between the reinforcing inserts and the die-cast body section of the joint.

Figure 17:
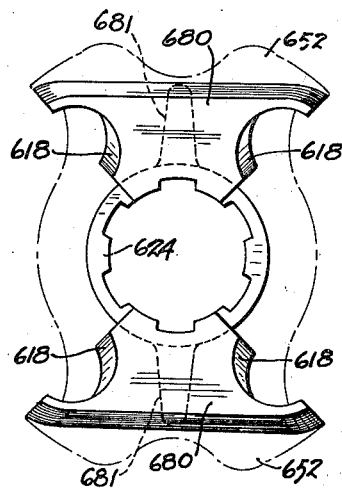
Figure 17 is an end elevation of a joint having interconnected race, spline and arm inserts.
Figure 18:
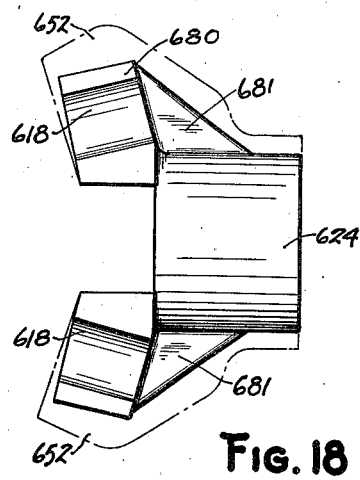
Figure 18 is a side elevation of the joint of Figure 17.

Figures 17 and 18 show an embodiment of the invention, wherein the insert forged as a single skeletonized unit provides all reinforcement and bearing surfaces required in the joint. Further, the surfaces that require finishing, such as the ball races and splines, are extremely accessible. Reinforcing portions 680 for the arms 652 are provided with ball races 618 and join splined portion 624. The portions 680 and 624 are further reinforced by the webs 681.

Figures 19 to 24 are isometric projections of insert members provided with various types of arm reinforcing members to more securely support the arms of the body section and to facilitate a more perfect bonding action between the cast body section and the reinforcing inserts.

Figure 19 shows an insert having a splined section 724 to which are welded or otherwise properly secured a pair of concave reinforcing segments 727 provided with apertures 729 to reinforce the arms of the body section, and to facilitate the casting operation.

Figure 20 shows a splined insert 724 wherein the outer periphery is corrugated as shown to increase the coefficient of friction between the cast body section and the insert. A pair of oppositely disposed convex reinforcing segments 731 having apertures 733 therein are welded or otherwise secured to the insert 724 to support the arms and reinforce the body section of the joint.

The embodiment of Figure 21 shows a splined insert 724 having U-shaped reinforcing segments 735 provided with apertures 737 to reinforce the arms of the joint. It will be observed that the segments 735 are convex with respect to the insert 724 and extend well into the arms of the joint.

The embodiment of Figure 22 is similar in many respects to the embodiment of Figure 21. A U-shaped reinforcing segment 739 having apertures 741 is welded or otherwise properly secured to the insert 724 in the convex position with respect to the insert 724. This structure has been found to be very desirable and to produce a relatively strong universal joint.

In the embodiment of Figure 23 the insert 724 is provided with box-type reinforcing segments 743 adapted to project into the arms of the universal joint to strengthen those sections of the joint. It will be observed that the segments 743 are formed with perpendicular and angularly disposed sections adapted to facilitate the proper bonding action of the joint.

The embodiment of Figure 24 is similar in many respects to the embodiment of Figure 23. It will be observed, however, that the reinforcing segments 743 are provided with outwardly flared sections 745 disposed at approximately right angles to the angularly projected portion 747 of the reinforcing member 743. This structure has been found to provide very good bonding action in service.

Figures 25 to 27 show end and two side elevations of an insert 824 having paired reinforcing segments 851 welded or otherwise secured to the splined insert 824. As will be observed from a consideration of Figure 26 the segments 851 are shaped to conform to the general shape of the arms of the joint when completely formed so as to provide the maximum reinforcing area for the arms of the joint.

Figures 28 and 29 show end and side elevations of a cast universal joint having inserts 924 provided with reinforcing segments 953 projecting into the arm members. Each of the segments 953 is welded or otherwise secured to the race inserts 925, and acts to reinforce the arm sections of the joint. It will be observed that the segments 953 are formed of a single element bent to contact the splined insert 924, and to engage the race inserts 925.

In the embodiment of Figures 30 and 31, a joint is illustrated of the same general type as illustrated in Figures 28 and 29. It will be observed, however, that the splined insert 1024 is provided with segments formed by two bent elements 1055 spot-welded or otherwise securely fixed to the splined member and projecting through the arm to engage the race inserts 1025.

The embodiments of Figures 32 and 33 are similar in some respects to those illustrated in Figures 30 and 31. It will be observed, however, that the race inserts 1125 are tied to the splined insert 1124 by means of separate segments 1159, securely tying the race inserts to the splined insert and reinforcing this portion of the joint.

Figures 34 and 35 illustrate a modified form of reinforcing elements wherein the race inserts 1225 are secured to reinforcing segments 1263 which project into and form a portion of the splined insert 1224. The construction of this embodiment is more clearly illustrated in Figure 34, it being understood of course that the cooperating segments 1263 may be spot-welded or otherwise securely fixed together and to the race inserts 1225.

Figure 36:
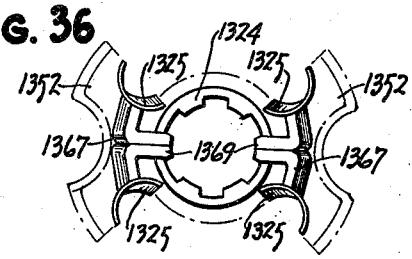
Figure 36 is an end view of a still further modified form of a joint body section.
Figure 37:
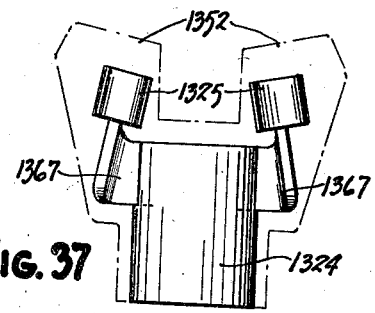
Figure 37 is a side elevation of Figure 36.

The embodiment of Figures 36 and 37 is similar in many respects to the embodiment of Figures 34 and 35. It will be observed that the reinforcing segments 1367 are fixed to the race inserts 1325 and project into the splined insert 1324 to form one of the indentations 1369 on each side of the splined insert 1324.

Figure 38:
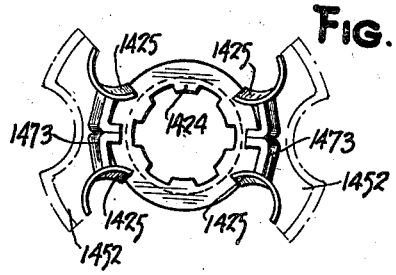
Figure 38 is an end elevation of a further modified form of joint member.
Figure 39:
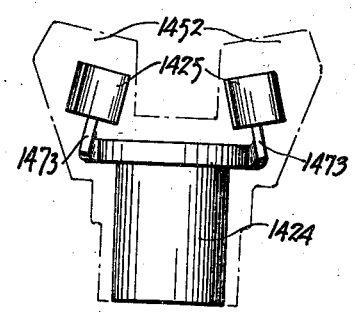
Figure 39 is a side elevation of Figure 38.

The embodiment of Figures 38 and 39 is such that the reinforcing segments 1473 are fixed to the race inserts 1425, and are welded or otherwise secured to the race insert 1424.

Figure 40:
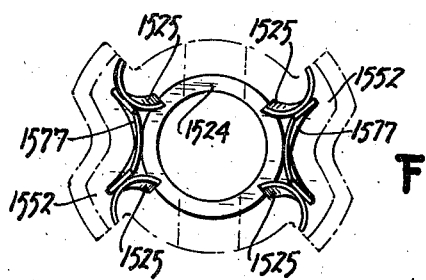
Figure 40 is an end elevation of a still further modified form of universal joint.
Figure 41:
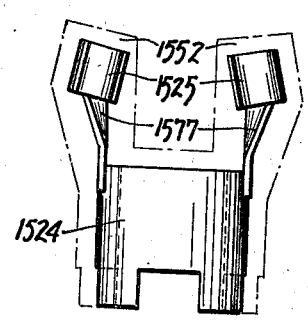
Figure 41 is a side elevation of Figure 40.

Figures 40 and 41 show a modified form of reinforcing structure wherein generally U-shaped stampings 1577 interconnect the race inserts 1525 and are fixed to the inserts 1524.

It will be observed that in the embodiments of Figures 28 to 41 the reinforcing segments may be stamped or otherwise formed, and fixed to the race inserts and to the splined inserts in any suitable manner. If desired, the race inserts and the reinforcing segments can be formed in a single operation by stamping from a suitable blank, or the race inserts, splined inserts and reinforcing segments may be formed from a single piece of suitable material by a stamping operation, or in any other desired manner.

The embodiment of Figures 42 and 43 illustrates a universal joint wherein one of the body members is provided with a flanged base 1681 adapted to be secured to a matching flange or abutment carried by a connecting shaft or other member. As more clearly shown in Figure 43 the flanged member 1681 is formed with a reinforcing insert 1683 of suitable material, connected to the race inserts 1625 by interconnecting segments 1685. The reinforcing insert 1683 is provided with a cast outer layer of material 1689 in the same manner that the other embodiments of this invention are surrounded by the cast body sections of the joint.

Figures 44, 45, and 46 are end elevations of flanged joints showing various means of interconnecting the reinforcing inserts 1783 and the race inserts 1725.

Figure 44 shows arcuate upright reinforcing members 1791 to which are secured at one end ball race inserts 1725. The other ends of the members 1791 are suitably joined to the plate or base flanges 1783. Base flanges 1783 are provided with a plurality of holes 1762 to permit the surface covering metal to flow therethrough and insure a good bond.

Figure 45 shows the base flange 1783 and the reinforcing uprights 1793 formed as a unit from a single piece of stock. It can readily be seen from the illustration that the uprights 1793 are punched from the central portion of the base flange 1783 bent upwardly until substantially normal thereto, and also partially bent upon themselves to form suitable supporting surfaces for the race inserts 1725. Forming the uprights 1793 from the base flange 1783 in this manner provides an extremely rigid support in the joint arms 1752.

Figure 46 shows the upstanding segments 1785 connected to the inner portion of race inserts 1725. The connecting webs 1795 are spot-welded or otherwise suitably secured to the segments 1785 at the inner portion, and are fixed to the outer portions of the race inserts 1725 at their outer ends. The race inserts 1725 are thus fixed at both the inner and outer edges by a triangulated structure which materially increases the strength of the joint, and facilitates the distribution of torsional forces in the body section of the joint.

Referring now to Figure 47, there is shown for purposes of further illustrating this invention, a universal joint of the constant angular velocity type having two body sections 2010 and 2012. The body section 2010 is provided with a splined shank 2014 adapted to engage the splined end 1016 of a shaft 2018. The body section 2012 is provided with a flange 2020 adapted to engage a cooperating flange 2022 fixed to a shaft 2024. The flanges 2020 and 2022 are held in fixed relation by any suitable means, such, for example, as the bolts 2026.

The body sections 2010 and 2012 are provided with cooperating interengaging arms 2028 and 2030 respectively. The adjacent faces of the arms 2028 and 2030 are provided with hardened semi-cylindrical longitudinally extending inserts 2032 and 2034 respectively formed of steel or other suitable material. Spherical members or balls 2036 are positioned in the circular inserts 2032 and 2034 carried by the cooperating arms 2028 and 2030.

It will be observed that the raceways formed by the inserts 2032 and 2034 converge at a point in front of each of the body sections. An angle is thus formed between the inserts 2032 and 2034 forming the raceways between the cooperating arms 2028 and 2030 to move the balls 2036 to such a position as to always bisect the angle formed between the shafts 2018 and 2024.

The splined shank 2014 of the body member 2010 may be formed with a hardened insert of steel or other suitable material 2038 or 2040, as more fully shown in Figures 50 and 51. If desired, the body member 2010 may be provided with an externally splined shaft engaging projection as illustrated in Figure 54. Where this expedient is resorted to it may be desirable to provide a reinforcing sleeve or shell 2042 or 2044, as illustrated in Figures 52 and 53 respectively.

The inserts 2032 and 2034 may be formed of stampings or from a tubular structure, split down the center, or in any other desirable manner. They may be machined to the desired degree of smoothness, and then heat treated by being subjected to a proper temperature to assure the desired degree of hardness. The spline inserts 2038, 2040, 2042 and 2044 may be formed by a stamping, drawing or rolling process, or in any other desired manner, and then heat treated in the same manner that the inserts 2032 and 2034 are treated.

According to one desirable method of forming the illustrated joint the inserts 2032 and 2034 may be positioned in the mold of a die-casting machine and the metal of the body section of the joint flowed into the mold at an appropriate temperature and pressure conforming to die-casting principles. When the metal of the body section has cooled sufficiently the mold is opened and the completed joint removed. If a splined insert is employed, it may of course be positioned in the die-casting mold along with the race inserts before the metal of the body section of the joint is injected into the mold.

One desirable method of assuring a proper bond between the hardened inserts and the body section of the joint is to roughen or corrugate the cast metal contacting surface or surfaces of the insert. This method of securing a proper bond between the insert and the body of the joint is employed in the devices illustrated in Figures 50 and 53 also, wherein shaft engaging splines are illustrated. It may also be desirable to employ a hook fixed to the convex side or the end of the insert to be embedded in the metal of the body section. If desired the inserts may be positioned in the body section after the body section has been cast. If this expedient is resorted to the inserts may be prevented from becoming displaced by any desired method, such, for example, as that illustrated in Figure 49, wherein the metal of the body section is deformed to engage the insert to prevent displacement thereof.

The embodiment of the invention illustrated in Figure 49 is similar in many respects to the embodiment of Figure 47; corresponding numbers with the addition of 100. It will be observed that in this embodiment, the insert 2134 is longer than the insert 2034 of Figure 47, and that means including an aperture 2150 are provided to permit the insertion of the insert 2134 through the flange 2120. The insert 2134 is prevented from drifting on through the body section 2112 by means of the shoulder 2152, and is prevented from moving back toward the flange 2120 by upsetting the material of the body section as illustrated at 2154. The elongated insert 2134 is desirable in shafts of the type wherein rolling end motion between the body sections of the shaft is desirable to prevent slipping between the splines of the joint member and the shaft.

Figure 54 illustrates a type of constant angular velocity joint adapted particularly for use where large cramping angles between the shafts must be provided. Corresponding reference numerals, with the addition of 200, have been applied to parts corresponding to the parts described in connection with Figure 47. It will be observed that the body sections 2210 and 2212 are provided with curved inserts 2260 and 2262 respectively to form the raceways in which the balls 2236 are positioned to transmit the torque from one of the body members to the other. The curved races facilitate increasing the allowable cramping angle of the joint as more fully described in Patent No. 1,522,351, issued to Carl W. Weiss, dated January 6, 1925. It will also be observed that a central ball 2264, positioned between the central end portions of the body members of the joint, is provided to render the angular displacement of the joint more uniform. The central ball 2264 is carried in a raceway formed by hardened inserts 2266 and 2268 of steel or other suitable material carried by the central portions of the body members 2210 and 2212 respectively.

The inserts 2260 and 2262 may be fixed in the body members 2210 and 2212 respectively, in the same manner that the straight race inserts are fixed in the body members 2010 and 2012 of the embodiment illustrated in Figure 47.

The embodiment of the invention illustrated in Figures 55 and 56 illustrates a universal joint of the type wherein a pair of cooperating concentric spherical members 2370 and 2372 are employed. The inner spherical member 2370 is provided on its outer surface with longitudinally extending raceways 2374 to receive hardened inserts 2376 formed of steel or other suitable material adapted to receive the ball members 2378. The outer spherical member 2372 is provided on its inner surface with longitudinally extending grooves 2380 adapted to receive hardened inserts 2382 designed to cooperate with the inserts 2376 to receive the ball members 2378 therebetween. Torsional force is exerted from one member of the joint to the other through shear on the ball members 2378. The ball members 2378 are positioned in a cage 2384 adapted to prevent longitudinal displacement of any of the ball members, and to facilitate holding the ball members in such a position as to bisect the angle between the shafts operably connected to the spherical body members 2370 and 2372 of the joint.

This type of joint is similar to the joint disclosed in the Patent No. 1,524,161 to Carl W. Weiss, granted January 27, 1925.

In this joint the inserts 2376 and 2382 may be fixed in the respective body members in the manner heretofore described.

Means including a suitably designed cage are provided to cover the body members of the joint and to protect the internal structure of the joint from foreign matter of any kind, and to retain the lubricant therein. It is understood, however, that other means may be provided not specifically set out herein for lubricating the moving elements of the joint.

The specific compositions of both the inserts and the body sections as well as the temperatures employed in the heat treating and casting operations, may of course vary between wide limits. One desirable composition, and the range of temperatures found to give satisfactory results, is, however, set out herein by way of example.

The inserts may be formed of steel of the type known to the trade as S. A. E. 4620. This particular steel incorporates approximately .15% to .25% carbon; .40% to .70% magnesium; .04% or less phosphorous; .05% or less sulphur; 1.65% to 2.00% nickel; and .20% to .30% molybdenum.

The steel of the general type indicated above may be heated to an appropriate carbonizing temperature of approximately 1700° F.; formed to the proper shape to form the inserts; the front or concave surface finished to the desired degree of smoothness; the back or convex surface knurled or roughened to secure a more perfect bond with the die-cast metal, and the inserts subsequently hardened by quenching in oil or other suitable fluid from approximately 1500° F. This treatment will harden the inserts to a "Rockwell" hardness of approximately 60 to 63 points.

The body of the joint may be formed of an alloy known to the trade as die-cast metal #3, comprising approximately 4.1% aluminum; .045% magnesium; .007% or less lead; .01% or less copper; .010% or less tin, iron and cadmium, and the balance zinc.

The inserts, formed in the manner indicated above, are placed in the die-casting machine and are retained in proper position by magnetizing the guide pins or in any other desired manner. An alloy of the desired consistency such as that indicated above is then injected into the die-cast mold at a temperature of approximately 770° F. to 785° F. The temperature to which the inserts are subjected during the casting operation effects a drawing operation on the inserts, thereby relieving internal stresses. The heat of the drawing or casting operation does not materially affect the hardness of the inserts, possibly one point of hardness on the "Rockwell" scale.

A universal joint formed in accordance with this invention does not require machine work after the casting operation has been performed because the inserts are not deformed during the casting operation. Generally all that is necessary is to remove a layer of scale that may have formed during the casting operation. If desired, however, it is to be understood that the inserts may be machined after the body section of the joint is cast.

This application is a continuation-in-part of my copending application, Serial No. 42,260, filed September 26, 1935.

Features shown but not claimed herein are being claimed in the copending application of Ernest R. Koppel, Serial No. 65,256, filed February 24, 1936, and assigned to applicant's assignee.

While the invention has been described with particular reference to a number of specific embodiments, it is not intended to limit the scope of the invention to the embodiments shown, as many changes can be made in the specific arrangement and combinations of the reinforcing elements and the casting operations to form a very strong die-cast universal joint which may be formed in accordance with the teachings of the present invention. Reference will therefore be had to the following claims for a definition of the scope of this invention.

I claim:

1. A die-cast universal joint of the constant angular velocity type having a body section including a pair of arms, a splined shank to connect the joint to a shaft, a reinforcing insert in the splined shank, a reinforcing member fixed to the reinforcing insert and projecting into the arms, and hardened race inserts positioned in the arms and fixed to said reinforcing member.

2. A universal joint member comprising a splined member adapted to receive a shaft, a pair of radially extending reinforcing members fixed to the splined member, a pair of hardened inserts fixed to each of the reinforcing members, and a die-cast body section surrounding the insert and reinforcing members.

3. In a universal joint of the constant angular velocity type, a die-cast body section including a pair of arms, a splined element to engage a shaft, a splined insert having reinforcing segments extending into the arms, reinforcing webs between the splined insert and the reinforcing segments, a pair of raceways formed in each of the arms, hardened inserts positioned in each of the raceways, and means including a plurality of apertures in the splined element and reinforcing segments to increase the bonding action between the inserts and the die-cast body section.

4. A metal insert for a cast universal joint having a plurality of arms, comprising an internally splined generally cylindrical member having generally radially extending concave rigidifying segments fixed to said member at the apex of the concave segment.

5. A metal insert for a cast universal joint having a plurality of arms, comprising an internally splined generally cylindrical member having generally radially extending convex rigidifying segments fixed to said member at the sides opposite the apex of the convex segment.

6. A constant angular velocity universal joint member comprising a die-cast body section including a plurality of spaced arms and a flanged base, a plurality of raceways formed in the arms, a ferrous reinforcing insert in the flanged base, reinforcing ferrous segments fixed to said reinforcing insert and extending to the arms, and hardened ferrous inserts positioned in said raceways and connected to the reinforcing segments by a spot-welding operation.

7. A universal joint including a die-cast body section of an alloy of the general type known as die-cast alloy No. 3, having a stamped and welded cylindrical insert including generally radially extending reinforcing segments, and a plurality of generally cylindrical race inserts.

8. A constant angle velocity universal joint including a pair of spaced arms, a die-cast body section of an alloy of the general type known as die-cast alloy No. 3, having a cast generally cylindrical splined insert including generally radially extending reinforcing segments of a ferrous material, and a plurality of generally cylindrical race inserts of a ferrous material.

9. A universal joint member having a plurality of longitudinally extending carbonized steel inserts positioned in the body section, a die-cast body section formed around the inserts, a sleeve formed integral with the body section, and a splined steel insert carried by the sleeve.

10. A die-cast universal joint including a body member and a plurality of spaced arms, a stamped reinforcing insert positioned in the body section and provided with radially extending reinforcing segments projecting into the spaced arms.

11. A die-cast universal joint of the constant angular velocity type including a body member and a plurality of spaced arms having raceways on opposite sides of each arm, a stamped reinforcing insert positioned in the body section and provided with radially extending reinforcing segments projecting into the spaced arms, and hardened race inserts positioned in the raceways.

12. In a constant angular velocity universal joint member, a stamped splined welded longitudinally extending reinforcing insert having radially extending reinforcing segments, a die-cast body section including a pair of spaced arms surrounding the insert and the radially extending reinforcing segments, and a pair of hardened race inserts positioned in each of the arms to distribute the torsional forces exerted on the arms over a comparatively large area of each of the die-cast arms.

13. A die-cast universal joint having a body section including a pair of arms, means to connect the joint to a shaft, a reinforcing insert in the connecting means, a reinforcing member fixed to the reinforcing insert and projecting into the arms, and race inserts positioned in the arms.

14. A universal joint member comprising a shaft engaging member, a pair of radially extending reinforcing members fixed to the shaft engaging member, a pair of inserts fixed to each of the reinforcing members, and a die-cast body section surrounding the insert and reinforcing members.

15. In a universal joint of the constant angular velocity type, a die-cast body section including a plurality of arms, a shaft engaging element, an insert having reinforcing segments extending into the arms, a plurality of raceways formed in each of the arms, and inserts positioned in each of the raceways.

16. In a universal joint of the constant angular velocity type, a die-cast body section including a pair of arms, an element to engage a shaft, an insert having reinforcing segments extending into the arms, reinforcing webs between the insert and the reinforcing segments, a pair of grooves formed in each of the arms, raceways positioned in each of the grooves, and means including a plurality of apertures in said element and reinforcing segments to increase the bonding action between the inserts and the die-cast body section.

17. A universal joint member comprising a die-cast body section including a plurality of spaced arms and a shaft engaging portion, a plurality of raceways formed in the arms, a reinforcing insert in the shaft engaging portion, reinforcing segments fixed to said reinforcing insert and extending to the arms, and hardened inserts positioned in said raceways and connected to the reinforcing segments.

18. A die-cast universal joint of the constant angular velocity type including a body member and a plurality of spaced arms having raceways on opposite sides of each arm, a reinforcing insert positioned in the body section and provided with reinforcing segments projecting into the spaced arms, and race inserts positioned in the raceways.

19. In a constant angular velocity universal joint member, a longitudinally extending reinforcing insert having reinforcing segments, a die-cast body section including a pair of spaced arms surrounding the insert and the reinforcing segments, and a pair of race inserts positioned in each of the arms to distribute the torsional forces exerted on the arms over a comparatively large area of each of the die-cast arms.

JOHN M. FLOYD.